(No Model.)
J. W. BOWMAN.
HAND GARDEN CULTIVATOR.
No. 403,413.          Patented May 14, 1889.
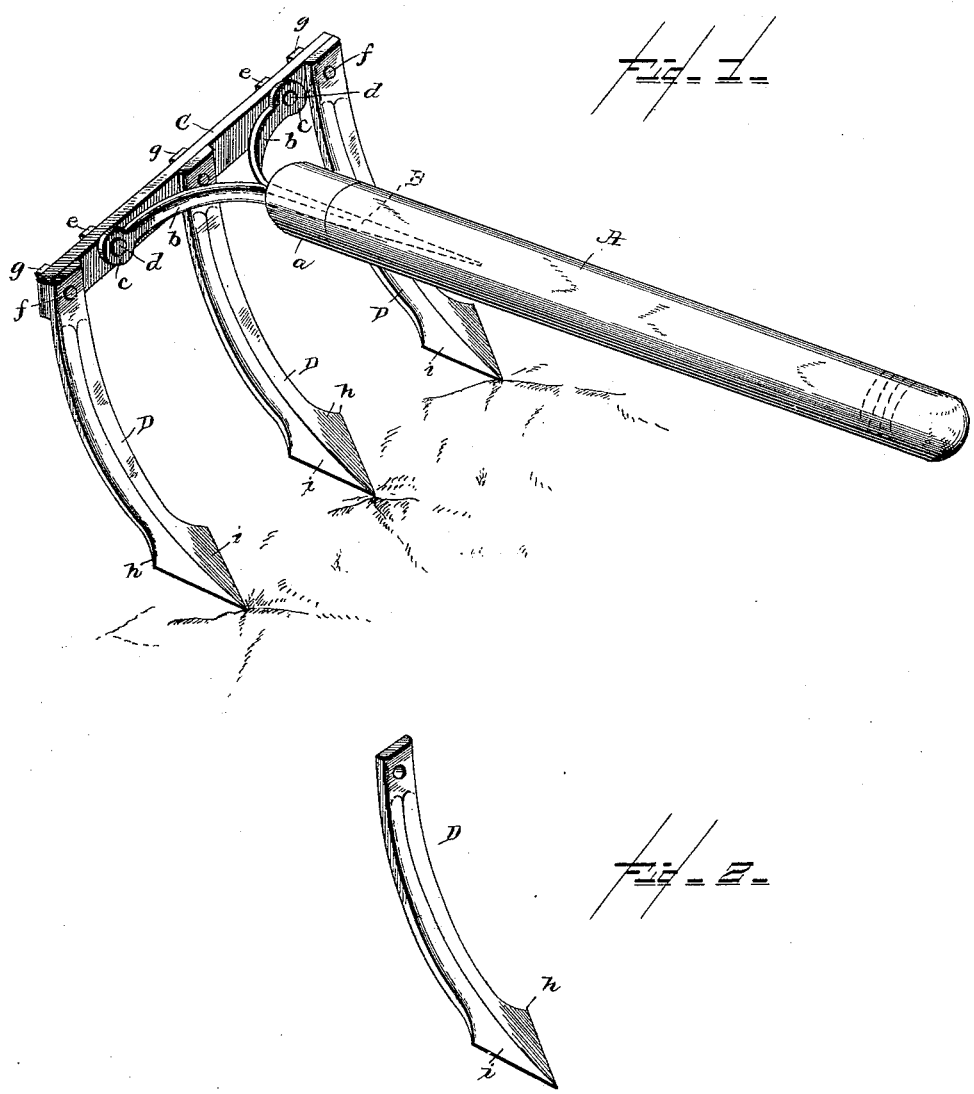
Witnesses.
Albert Speiden
W. F. Singer
Inventor,
James W. Bowman
By his Attorney
Franklin H. Hough
N. PETERS, Photo-Lithographer, Washington, D. C.

UNITED STATES PATENT OFFICE.

JAMES W. BOWMAN, OF COLLEGE CORNER, OHIO.

HAND GARDEN-CULTIVATOR.

SPECIFICATION forming part of Letters Patent No. 403,413, dated May 14, 1889.

Application filed February 12, 1889. Serial No. 299,635. (No model.)

*To all whom it may concern:*

Be it known that I, JAMES W. BOWMAN, a citizen of the United States, residing at College Corner, in the county of Butler and State of Ohio, have invented certain new and useful Improvements in Hand Garden-Cultivators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in hand garden-cultivators; and it has for its object to improve upon prior devices of this class and to devise an implement which shall be simple and cheap of construction, durable and efficient in operation, and which will permit of ready and easy repair in case of breakage.

The novelty resides in the peculiarities of construction and in the combinations, arrangement, and adaptation of parts, all as more fully hereinafter described, shown in the drawings, and then particularly pointed out in the appended claim.

The invention is clearly illustrated in the accompanying drawings, which, with the letters of reference marked thereon, form a part of this specification, and in which—

Figure 1 is a perspective view of my invention. Fig. 2 is a like view of one of the prongs detached.

Like letters refer to like parts throughout both views.

Reference now being had to the details of the drawings by letter, A represents a handle, which may be formed of any suitable material and of any desired length. This handle is provided at one end with a metallic band, $a$.

B is a shank secured in the end of the handle and formed with the diverging arms $b$, the outer ends of which are provided with the eyes $c$.

C is a bar arranged at right angles to the handle, as shown, and secured thereto by the bolts $d$ and nuts $e$, said bolts passing through the eyes $c$ of the arm $b$.

D D are the prongs or teeth, the shanks of which are secured to the bar C, preferably by means of the transverse bolts $f$ and nuts $g$, so that the teeth may be readily replaced by new ones in case they are broken, or easily removed to sharpen the teeth when occasion may require. These teeth or prongs are formed on a continuous curve from the upper end of the shank to the tip of the point, both upon their front and rear faces, except the upper end of the rear face, which is substantially vertical to form a flat bearing against the bar C. These teeth are also tapered in cross-section toward their lower end, and are also broadened out at the point $h$, from whence they taper to the point. They are also beveled in opposite directions from a central line from the point of the tooth to the end of the shank, as shown at $i$.

An implement constructed as above described will be found very useful for all purposes to which such devices are usually put, and in use the depth can be regulated by simply raising or lowering the handle.

What I claim to be new is—

A hand garden-cultivator consisting of a handle, the shank B, secured therein and formed with the diverging arms $b$, having eyes $c$, the transverse bar C, the bolts $d$, passed through said eyes and bar, the nuts on said bolts and the teeth having shanks, and the transverse bolts $f$, passed through said shanks, and nuts $g$, by which they are detachably secured to the front face of said bar, substantially as shown and described.

In testimony whereof I affix my signature in presence of two witnesses.

JAMES W. BOWMAN.

Witnesses:
GEORGE WEIDNER,
W. H. GEORGE.